United States Patent
Vig

[15] 3,641,871
[45] Feb. 15, 1972

[54] MILLING TOOL

[72] Inventor: Istvan Vig, Zurich, Switzerland
[73] Assignee: Aktiengesellschaft Brown, Boveri & Cie, Baden, Switzerland
[22] Filed: July 15, 1969
[21] Appl. No.: 841,700

[30] Foreign Application Priority Data

Oct. 29, 1968 Switzerland..........................16097/68

[52] U.S. Cl. ............................................................90/11 A
[51] Int. Cl. ..............................................................B23c 5/00
[58] Field of Search ..............................90/11.1, 11, 15.2, 15

[56] References Cited

UNITED STATES PATENTS

| | | |
|---|---|---|
| 2,199,379 | 5/1940 | Tornebohn..................................90/11 |
| 2,530,502 | 11/1950 | Baney..........................................90/11 |
| 3,383,988 | 5/1968 | Grueninger..................................90/11 |

FOREIGN PATENTS OR APPLICATIONS 686,819  1/1940  Germany............................90/11 (.1)

*Primary Examiner*—Gil Weidenfeld
*Attorney*—Pierce, Scheffler & Parker

[57] ABSTRACT

A milling tool structure comprises a rotatable milling head which carries a cutting tool having a circular cutting edge. A power takeoff derived from rotation of the milling head is used to impart a relatively slower rotation to the cutting tool so as to present a continuously changing cutting point on its circular cutting edge to the work.

The power takeoff can be in the form of a worm-type of drive or planetary-type of drive.

3 Claims, 7 Drawing Figures

PATENTED FEB 15 1972

INVENTOR
Istvan Vig

By Pierce, Scheffler & Parker
Attorneys

PATENTED FEB 15 1972 3,641,871

INVENTOR
Istvan Vig

By Pierce, Scheffler & Parker
Attorneys 3,641,871

MILLING TOOL

This invention relates to the art of milling tools and more particularly is directed to an improvement in the type of milling tool which is provided with a circular cutting edge.

A milling tool having a circular cutting edge has the advantage that the cutting edge extends over the entire circumference of the tool thus resulting in a longer tool life since freshly ground cutting points can be made available simply by turning the tool slightly about its mounting axis.

With the known types of construction for a circular edged milling tool, the tool is secured in place by means of a screw, and rotational adjustment of the tool to present a fresh cutting point to the work is accomplished by loosening the screw, making the desired rotary adjustment and then retightening the screw. This is done with the tool at standstill. The disadvantage which attends such a construction is that the milled surface is thus never quite uniform.

A cutting edge, which always comes into contact with the work at the same point, wears out too soon. Particularly disadvantageous is the wear in broad finishing tools because the surface to be worked is limited, since the cutting edge cannot be exchanged during the milling operation because of the resulting surface difference. With increasing wear at the cutting edge, small grooves are formed on the milled surface of the work which extend along the cutting arcs. The grooves have an adverse effect, for example, on a milled surface used for sealing purposes, because they act like continuous channels.

In order to eliminate the disadvantages of the prior known construction for circular edged milling cutters, the present invention proposes that the milling cutter be so mounted on the milling head so as to be positively rotated about its own axis as the milling head is rotated. The advantage of rotating the circular edged cutter about its own axis is that it results in a uniform wear of the edge throughout its circumference and also in an equalization of the milled surface of the work.

In the following detailed description, two different embodiments of the invention will be disclosed and these are illustrated in the accompanying drawings wherein.

Figure 1A:
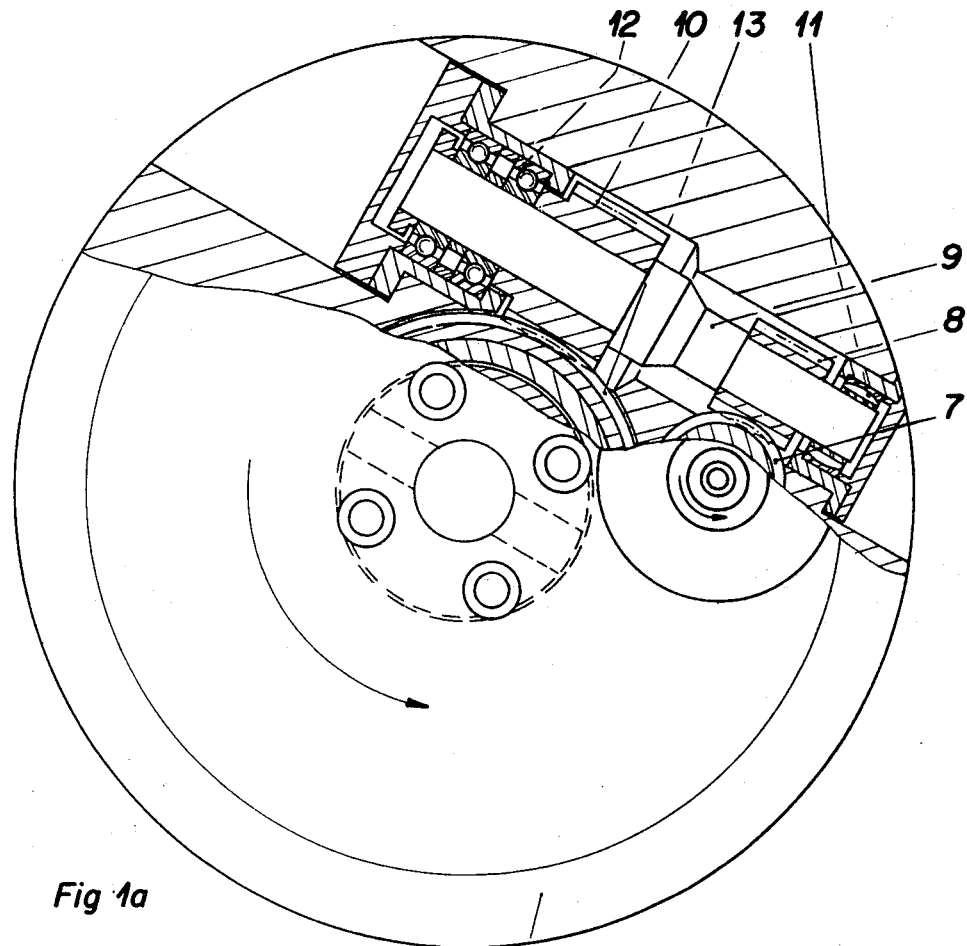
FIG. 1a is a view in top plan of the rotatable milling head with certain parts cut away to show the arrangement of a worm-type of drive by which rotation is imparted to the circular edged milling tool as the milling head is rotated.
Figure 1B:
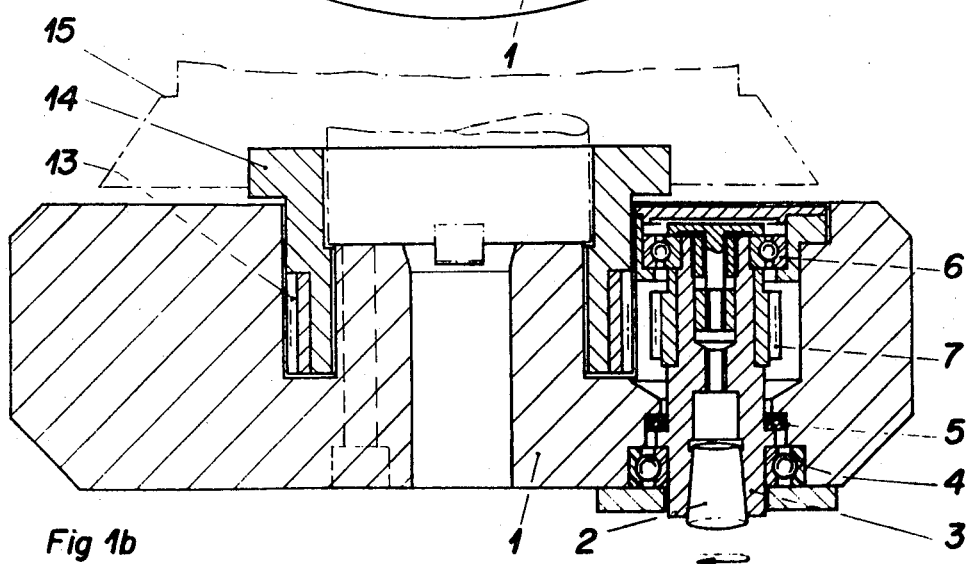
FIG. 1b is a vertical diametral sectional view through the milling head showing the tool element and its supporting spindle.

With reference now to the drawings and to FIGS. 1a and 1b, in particular, the milling head of the milling machine is indicated by numeral 1 and is mounted in the usual manner on a driving spindle 1' for rotation about its axis. The tool element 2 which has a frustoconical configuration presenting a of cutting edge is secured within a recess in a spindle 3 which in turn is mounted for rotation about its axis by means of two axially spaced sets of ball bearings 4 and 6. The tool axis is coincident with the axis of rotation of its supporting spindle. Spindle 3 is provided with a thrust bearing 5 and a worm wheel 7 intermediate the two ball bearing sets 4, 6 The worm wheel 7 meshes with, and is driven by, a worm 8 secured upon a worm shaft 9 which is mounted for rotation about its axis within the body o the milling head by means of two sets of bearings 11, 12 located adjacent the opposite ends of this shaft. Secured upon the worm shaft 9 is a second worm wheel 10 which meshes with, and is driven by, a second worm 13 which remains stationary. Worm 13 is carried by a stationary hollow shaft 14 which is supported by a stationary part 15 of the milling machine, the hollow shaft 14 extending into an annular recess 1c located centrally within the body of the milling head such as to establish the axis of the stationary worm 13 coincident with the axis of rotation of the milling head 1. While worm 13 remains stationary, it will be evident that a rotary motion is nevertheless imparted to the worm wheel 10 meshed with it as the milling head is rotated, thus carrying the worm wheel 10 around the worm 13. Rotation of worm wheel 10 serves to drive the worm shaft 9 about its axis to thus impart a rotation to worm 8 which in turn effects rotation of its worm wheel 7 which in turn serves to rotate spindle 3 and thereby the circular edged tool 2. The drive arrangement is such that the tool rotates slowly in comparison to the rotational speed of the milling head and thus a slowly changing part of the periphery of the cutting edge is presented to the work.

Figure 3:
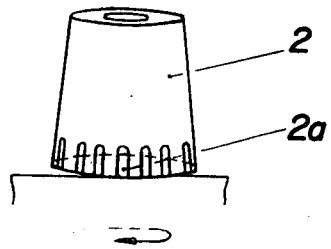
FIG. 3 is a detailed view of the tool element with the circular cutting edge, this view being drawn to a larger scale for the sake of clarity.
Figure 4:
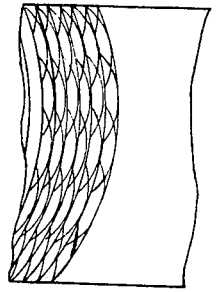
FIG. 4 is a view showing the course of the milling grooves.

Due to the rotary movement of the cutting edge, a progressive or paring cut is produced which yields a better milled surface, and particularly so in the case of softer work material. Moreover, since the cutting point on the edge presented to the work is always being changed, wear on the cutting edge will be distributed uniformly around its entire periphery. This results in better cooling of the heated cutting zone so that higher cutting velocities can be utilized. Also, rotary movement of the cutting edge has the effect that fine grooves formed on the milled surface by increasing wear extend more or less transverse to the cutting arcs, depending upon the speed of the cutting edge. By grinding surfaces 2a around the periphery of the cutting edge, as shown in FIG. 3, it can be achieved that the milled surface, similar to a scraped surface, exhibits minimum shell-like elevations, as shown in FIG. 4, which may be desirable for certain functions to be served by the milled surface such as for example surfaces which are utilized for sealing or for sliding.

Figure 1C:
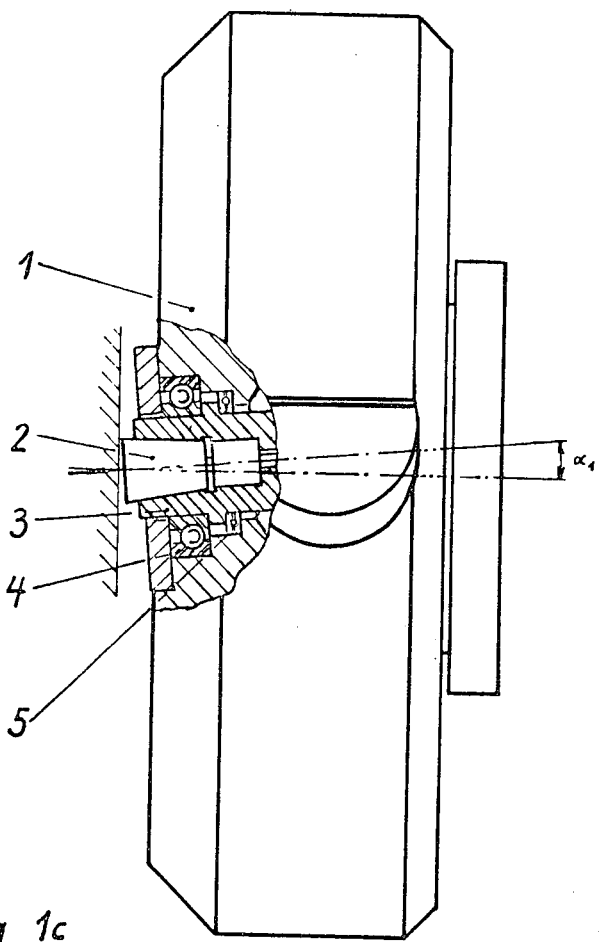
FIG. 1c is a side elevational view of the milling head with certain parts shown in section, the view being taken at a right angle to FIG. 1b, to better illustrate the oblique character of the axis of the tool spindle relative to the rotational axis of the milling head.
Figure 5:
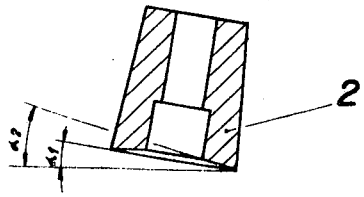
FIG. 5 is another view of the tool element showing the detail of the clearance angle between the work and the edge of the tool.

The axis of the circular edged tool is arranged oblique to the axis of rotation of the milling head 1 as shown more clearly in FIG. 5, hence in a tangential plane somewhat inclined with respect to the milling head. The oblique character of tool 2 is also shown in FIG. 1c. In this manner, a flat elliptical cutting edge with a clearance angle $\alpha 1$ is formed on the tool 2. This clearance angle can be increased to an angle $\alpha 2$ by bevelling of the end face of the tool.

Figure 2:
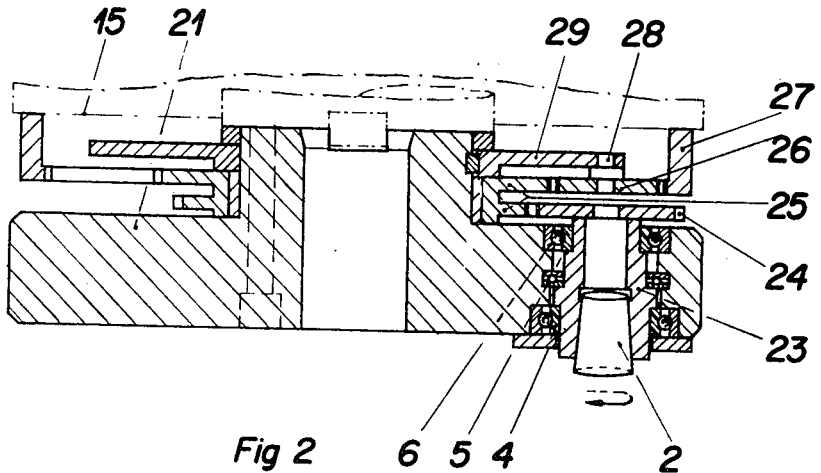
FIG. 2 is a vertical diametral section similar to FIG. 1b illustrating a second embodiment of the invention which utilizes a planetary-type of gearing for imparting rotation to the circular edged tool by rotation of the milling head.

A second embodiment of the invention is illustrated in FIG. 2 which employs a planetary-type of drive for effecting slow rotation of the circular edged tool as the milling head rotates.

In this embodiment, the rotary milling head is indicated by numeral 21, the circular edged tool element is again designed by numeral 2, and the spindle in which the cutter element is mounted has been designated 23. Spindle 23 is mounted for rotation in axially spaced bearings again illustrated by ball bearing sets 4 and 6, and the thrust bearing between the two bearing sets is also again designated by 5, this bearing serving to absorb the axial pressure exerted on the spindle during the milling operation. In order to provide a slow rotational drive for the spindle 23 and hence also the tool element 2, a gearwheel 24 secured upon one end of the spindle 23 meshes with one gear of a double-gearwheel 25 which is mounted coaxially on the milling head 21 but is so arranged as to be freely rotatable on the head 21. The other gear of the double-gearwheel 25 meshes with a planet gear 26 which also is in mesh with a ring gear 27 that is stationary and mounted on a stationary part 15 of the milling machine.

Planet gear 26 turns on an axle 28 which is inserted in a disc 29 fixedly secured on the rotary milling head 21.

Operation of the embodiment of FIG. 2 is as follows: When the milling head 21 is driven in rotation, the disc 29 rotates and carries with it the axle 28 so that axle 28 and planet gear 26 turn about the axis of the milling head 21. Due to the fact that planet gear 26 is meshed with a stationary ring gear 27, the planet gear 26 will also be driven about its own axis thus imparting rotation to the double-gearwheel 25 which in turn imparts rotation to gearwheel 24 and hence also to the spindle 23 on which this gear is secured thus causing the spindle 23 and the tool element 2 to rotate slowly about its axis in relation to the rotational speed of the milling head as a result of the reduction gearing effect produced by the planetary drive.

I claim:

1. In a milling tool structure the combination comprising a milling head, means mounting said milling head for driving rotation about its axis, a spindle, means mounting said spindle for rotation about its axis in the body of said milling head, the mounting axis of said spindle being displaced radially of and oblique to the mounting axis of said milling head, a cutting tool having a circular cutting edge secured to and coaxial with said spindle for engagement with the work as said milling head is rotated, and a power takeoff derived from rotation of said milling head and which imparts a relatively slower rotation to said spindle and cutting tool thereby to present a continuously changing cutting point on its circular cutting edge to the work.

2. A milling tool structure as defined in claim 1 wherein said power takeoff for imparting rotation to said spindle and cutting tool is constituted by a worm-type of drive which includes a wormshaft mounted for rotation about its axis within the body of said milling head, a worm on said wormshaft meshed with and driving a worm wheel secured upon said spindle, a second worm wheel secured upon said wormshaft, and a stationary worm mounted concentrically with said milling head, said second worm wheel being meshed with and rotatable about the axis of said stationary worm as said milling head is rotated thereby to impart rotation to said second worm wheel and thence to said wormshaft and spindle.

3. A milling tool structure as defined in claim 1 wherein said power takeoff for imparting rotation to said spindle and cutting tool is constituted by a planetary-type of drive which includes a gearwheel secured upon said spindle, a double gear wheel mounted coaxially on said milling head and which is freely rotatable relatively to said milling head, said gearwheel on said spindle being meshed with one of the gears of said double-gearwheel, the other gear of said double-gearwheel being meshed with a planet gear which is also meshed with a stationary ring gear mounted coaxially with said milling head, and said planet gear being mounted on an axle which is carried by said milling head in a circular path about the axis of said milling head as said milling head is rotated.

* * * * *